Oct. 27, 1959 E. B. FERNBERG 2,909,819
U-SHAPED SPRING METAL FASTENER FOR SNAPPING
IN AN APERTURED PLATE
Filed Feb. 2, 1956 2 Sheets-Sheet 1

Inventor
Eric Birger Fernberg
by Malcolm W. Fraser
attorney

Oct. 27, 1959  E. B. FERNBERG  2,909,819
U-SHAPED SPRING METAL FASTENER FOR SNAPPING
IN AN APERTURED PLATE
Filed Feb. 2, 1956                         2 Sheets-Sheet 2

Inventor
Eric Birger Fernberg
by Theodore W. Fraser
attorney

United States Patent Office 2,909,819
Patented Oct. 27, 1959

2,909,819

U-SHAPED SPRING METAL FASTENER FOR SNAPPING IN AN APERTURED PLATE

Eric Birger Fernberg, Northwood, England, assignor to F.T. Products Limited, London, England, a British company Application February 2, 1956, Serial No. 563,148

Claims priority, application Great Britain May 6, 1950

4 Claims. (Cl. 24—73)

This application constitutes a continuation in part of my application, Serial No. 222,309, filed April 23, 1951, now abandoned, and entitled J-shaped Spring Metal Fastener for Snapping in an Apertured Plate.

The present invention relates to an improved fastener which, although not limited exclusively thereto, is of particular advantage for holding a strip of rubber around the edges of the door of a motor vehicle, so as to exclude wind, dust and rain.

The invention also provides a novel assembly of resilient strip material secured to an apertured panel with the aid of one or more fasteners.

It is an object of the invention to provide a fastener which is simple to manufacture and therefore cheap and is efficient in operation.

Another object is to provide an assembly which includes a fastener one portion of which can be hooked on to a resilient member such as a rubber strip and another portion of which can be snapped into a hole formed in a rigid panel.

Yet another object is to provide a snap engaging fastener which can be sprung through an aperture comparatively easily, but which requires the exercise of considerable force to retract the fastener back through the aperture.

Other objects and advantages of the invention will become apparent to those skilled in the art from the following description.

Figure 3:
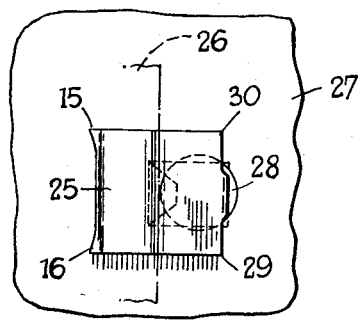
Figure 1:
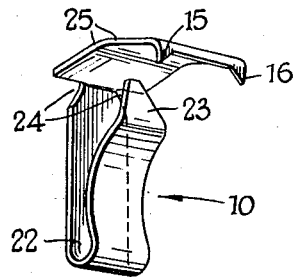
Figure 4:
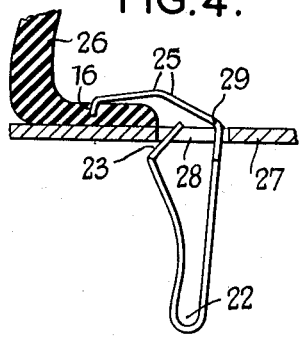
Figure 5:
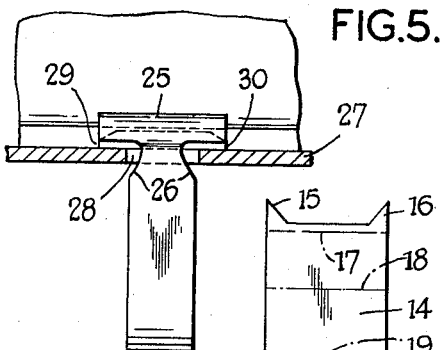
Figure 6:
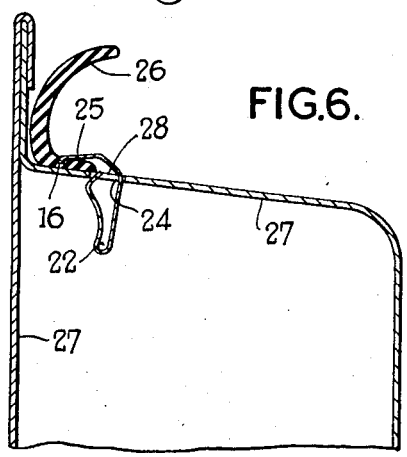
Figure 2:
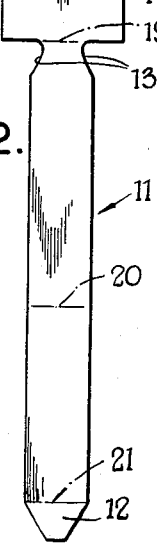
Figure 7:
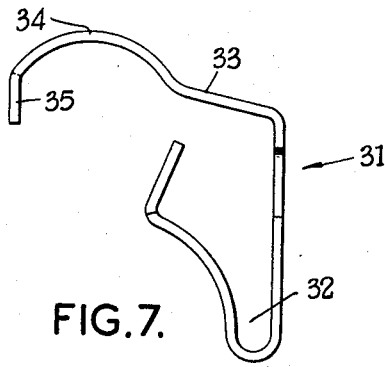
Figure 8:
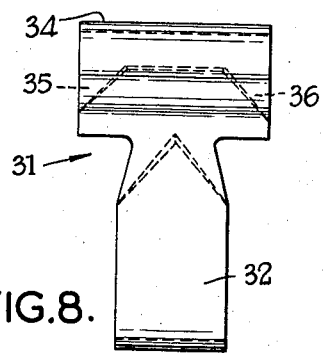
Figures 9, 10:
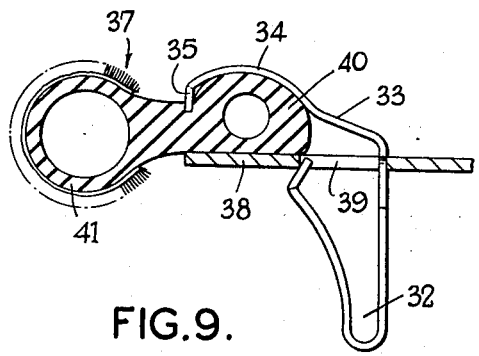
Figure 12:
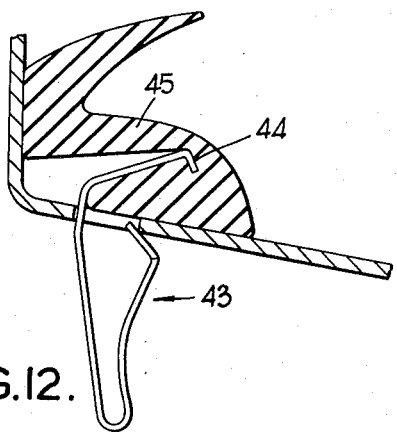
Figure 11:
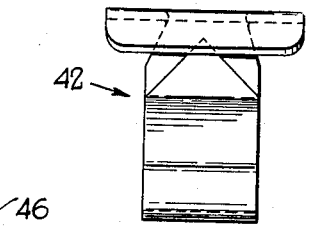
Figure 13:
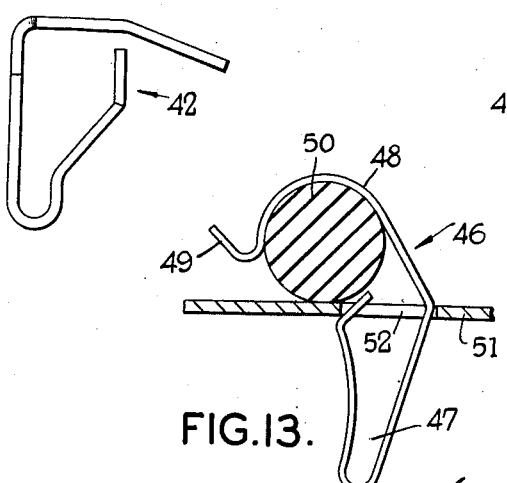

Preferred forms of the invention are illustrated in the accompanying diagrammatic drawings, in which:

Figure 1 is a perspective view of one form of fastener,

Figure 2 is a plan of a blank from which the fastener of Figure 1 may be formed, Figures 3, 4 and 5 are respectively a plan, sectional elevation and side elevation of the fastener of Figure 1, when engaged in a panel, Figure 6 shows the fastener of Figure 1 as used to hold a strip of rubber to the door of an automobile, Figures 7 and 8 are respectively front and side elevations of a modified form of fastener, Figure 9 is a front elevation, partly in section, of the fastener of Figures 7 and 8 when assembled with a strip and panel, Figures 10 and 11 are respectively front and side elevations of another fastener, and Figures 12 and 13 are front elevations, partly in section, of two further modifications of fastener assemblies.

Referring now to Figures 1 to 6, the fastener indicated generally at 10 in Figure 1 is produced from a blank 11 of strip steel shown in Figure 2. The blank is formed with a pointed end 12, a waist 13, a relatively wide portion 14, and two prongs 15 and 16. In order to form the fastener 10 the blank is bent along the lines 17, 18, 19, 20 and 21, all the bends being made about parallel lines and in the same angular sense.

In this way there is formed the fastener shown in Figure 1 which comprises a narrower U-shaped stud portion 22 having an inwardly-directed nose 23 and a waist 24, and a wider portion formed into an obtusely V-shaped claw 25 with prongs 15 and 16.

A plurality of such fasteners may be used with advantage to secure a strip of rubber of the channel-section shown at 26 (Figures 4 and 6) to the angle of a door indicated generally at 27 in Figure 6, the rubber being used as a seal when the door is shut to prevent draughts or moisture passing through the door.

The door is formed with a series of circular apertures of, say, ¼ inch diameter, one of which is shown at 28 in the figures.

The rubber strip 26 is secured in its correct position around the door with the aid of an adhesive and in order that it may be permanently secured in position a fastener of the kind shown at 10 is snapped into each hole so that the claw 25 engages the rubber, whilst the fastener is secured in the hole by engagement of the U-shaped stud 22 with the edges of the hole 28.

The width of the portion 11 of the blank, i.e. the width of the U of the fastener, may conveniently be about 7/32", so that when the two limbs of the U are pinched together the U-stud will pass through the hole and when the neck 24 and nose 23 reach the hole the limbs of the U-stud again expand until the fastener engages the circular edge of the hole at two points on the neck 24 and two points on the nose 23.

It is to be noted that the fastener engages the upper side of the door 27 along the shoulders 29—30 (Figures 3, 4 and 5), presses upon the upper side of the door 27 at the prongs 15, 16 through the rubber, and presses upon the underside of the plate at the two points on the nose 23 where the nose makes contact with the plate.

In this way the rubber is squeezed against the plate and held securely thereon.

The U-stud portion of the fastener engages the aperture, partly by virtue of the fact that the two limbs of the stud can spring apart and partly by virtue of the fact that the waist 24 and nose 23 taper inwardly.

If the sides of the U-shaped stud 22 had been left parallel throughout the whole of their length, i.e., had the sloping noise and waist been omitted, the parallel sides of the stud would cut a groove in the edges of the aperture, in which groove the edges would slide, in which case the stud could be retracted through the aperture relatively easily. But with the sloping nose and waist, as the stud tends to move in and out of the aperture, the sloping edges move around the edge of the aperture, so that they cannot cut a groove, with the result that the fastener cannot be retracted through the aperture except with the use of considerable force.

This advantage is obtained even through the aperture is non-circular, e.g. rectangular.

The fastener 31 illustrated in Figures 7, 8 and 9 is formed with a U-shaped spring stud 32 similar to that of Figures 1 to 6 (but of different proportion to fit a different sized hole) and with a hook 33 looped as at 34 and carrying prongs 35 and 36.

It is used, in the assembly shown in Figure 9, to attach a draught excluder strip 37 to a panel 38 formed with an aperture 39.

The stud 32 engages in the aperture 39 and the pronged hook 33 engages a rib 40 of the rubber excluder strip, another portion 41 of the strip serving as the draught excluder proper.

The fastener 42 illustrated in Figures 10 and 11 is substantially similar to that of Figures 1 to 6, except that the prongs are omitted and the proportions are different in order to fit a different size of aperture. It may be used in situations where the prongs are deemed superfluous.

The fastener 43 of Figure 12 is similar to that of Figures 1 to 6 except that the prongs have been replaced by a plain flange 44. This flange fits into a slot formed for the purpose in a rubber strip 45.

The fastener 46 shown in Figure 13 has a U-stud 47 similar to that of Figures 1 to 6 and has a curved hook 48, with a lead-in flange 49, designed to hold a cable 50 to a panel 51 formed with an aperture 52.

The U-shaped spring studs of all the fasteners engage in an aperture in the same way, and all of them have a hook crossing or overlying the open mouth of the stud and co-operating with the stud to hold one of the members to be secured resiliently against a panel.

What I claim is:

1. A fastener for securing together two members one of which is formed of thin substantially rigid sheet material and with an aperture, comprising a single strip of spring metal having relatively wide and narrow portions of widths respectively greater and slightly less than the width of said aperture measured across the strip, the narrow portion being substantially U-shape and having two arms, one of said arms being integral with the wide portion and the other arm having a free end adjacent to and underlying the wide portion, the arms forming an integral closed nose remote from the open mouth of the U, the wide portion extending generally at right angles to said one arm and overlying said mouth, the end of said arm adjacent the wide portion being reduced in width to provide upwardly and inwardly sloping shoulders thereon facing the wide portion, and the free end of the other arm being substantially pointed and having upwardly and inwardly sloping shoulders lying substantially opposite the first-mentioned shoulders and facing the wide portion.

2. A fastener for securing together two members one of which is formed of thin substantially rigid sheet material and with an aperture, comprising a single solid strip of spring metal having relatively wide and narrow portions of widths respectively greater and slightly less than the width of said aperture measured across the strip, the narrow portion being substantially U-shape and having two arms, one of said arms being integral with the wide portion and extending at generally right angles thereto from an edge thereof, the other of said arms having a free end adjacent to and underlying the wide portion, the end of the first mentioned arm adjacent the wide portion being reduced in width to provide inwardly extending sloping shoulders thereon facing the wide portion, and the free end of the other arm being substantially pointed and having inwardly extending sloping shoulders lying substantially opposite the first-mentioned shoulders and facing the wide portion.

3. The combination claimed in claim 2, the pointed end of said other arm being inclined towards the first-mentioned arm, that portion of said other arm adjacent the pointed end being inclined away from the first-mentioned arm.

4. An assembly including a panel formed of thin substantially rigid sheet material having opposite faces and a circular aperture, and a fastener securing a member on one of said panel faces, said fastener comprising a solid strip of spring metal having relatively wide and narrow portions of widths respectively greater and slightly less than the width of said aperture measured across the strip, the wide portion being engaged against said one panel face and overlying the aperture and having means thereon for engaging over the member, the narrow portion being substantially U-shaped and having two arms extending through the aperture, one of said arms being integral with the wide portion and extending at generally right angles thereto from an edge thereof, the other of said arms having a free end adjacent to and underlying the wide portion, the end of the first mentioned arm adjacent the wide portion being reduced in width to provide inwardly extending sloping shoulders thereon facing the wide portion, the free end of the other arm being substantially pointed and inclined towards said one arm and having inwardly sloping shoulders lying substantially opposite the first mentioned shoulders and facing the wide portion, that portion of said one arm adjacent the pointed end being inclined away from said one arm, the sloping edges of the shoulders on both arms engaging the edges of the aperture on the other face of the panel.

References Cited in the file of this patent

UNITED STATES PATENTS

| | | |
|---|---|---|
| 2,148,091 | Van Uum | Feb. 21, 1939 |
| 2,152,601 | Murphy | Mar. 28, 1939 |
| 2,171,925 | Fitts | Sept. 5, 1939 |